(12) United States Patent
Wu et al.

(10) Patent No.: US 9,329,358 B2
(45) Date of Patent: May 3, 2016

(54) LENS STOPPER MECHANISM

(71) Applicant: TDK TAIWAN CORP., Taipei (TW)

(72) Inventors: Fu-Yuan Wu, Taipei (TW); Yi-Ho Chen, Taipei (TW); Shih-Ting Huang, Taipei (TW)

(73) Assignee: TDK TAIWAN CORP., Taipei (TW)

( * ) Notice: Subject to any disclaimer, the term of this patent is extended or adjusted under 35 U.S.C. 154(b) by 10 days.

(21) Appl. No.: 14/283,461

(22) Filed: May 21, 2014

(65) Prior Publication Data

US 2015/0131166 A1    May 14, 2015

(30) Foreign Application Priority Data

Nov. 13, 2013  (TW) .............................. 102141208 A

(51) Int. Cl.
*G02B 15/14*  (2006.01)
*G02B 7/10*   (2006.01)

(52) U.S. Cl.
CPC ........................................ *G02B 7/10* (2013.01)

(58) Field of Classification Search
USPC ......... 359/700, 702, 704, 708, 811, 815, 819, 359/822–824
See application file for complete search history.

(56) References Cited

U.S. PATENT DOCUMENTS

2006/0257131 A1 * 11/2006 Yoon et al. ..................... 396/133
2009/0251810 A1 * 10/2009 Hara ............................. 359/824

* cited by examiner

*Primary Examiner* — Joseph P Martinez
*Assistant Examiner* — Brandi Thomas
(74) *Attorney, Agent, or Firm* — Bacon & Thomas, PLLC

(57) ABSTRACT

The present invention discloses a lens stopper mechanism comprising a case and a lens holder. The lens holder holds a lens and has at least one stopper portion; the stopper portion presses against the case after the lens holder moves toward the case for a predetermined distance.

3 Claims, 4 Drawing Sheets

LENS STOPPER MECHANISM

FIELD OF THE INVENTION

The present invention relates to a lens device, and more particularly to a lens stopper mechanism without a conventional stop cap for stopping the lens.

DESCRIPTION OF THE PRIOR ART

To achieve the focusing function of an imaging device, the lens in the imaging device is generally designed to move forward and backward along the optical axis, so that the focal length is adjusted and the image of the object can be clearly displayed on the screen. Typically, the movement of the lens along the optical axis has a predetermined range according to the configuration of the imaging device; therefore, the lens will not move too far to cause any bad effect. To achieve this, conventionally, a stop cap is provided between the case and the lens holder. As a result, when the lens holder moves toward the case and goes beyond the predetermined range of movement, the lens holder will press against the stop cap and be forced to stop moving further outward.

FIG. 1 is an exploded view of a prior art lens stopper mechanism. As FIG. 1 shows, in this prior art lens stopper mechanism, a stop cap 2 and an upper plate spring 3 are provided between a case 10 and a lens holder 40. The stop cap 2 limits the moving distance of the lens holder 40. That is, when the lens holder 40 moves beyond the predetermined range of movement, part of the lens holder 40 will press against the stop cap 2 and the stop cap 2 will provide resistance for stopping the lens holder 40 from moving further outward. Therefore, the object of limiting the movement of the lens holder 40 to a certain range can be achieved, so that the imaging device is able to function normally.

As described above, the prior art stop cap provides resistance for stopping the lens from moving further outward. However, the number of components within an imaging device, as well as the thickness and weight of the imaging device, may increase in the prior art design. Apparently, such a design needs improvement in an age that keeps developing more compact and lightweight electronic products.

SUMMARY OF THE INVENTION

In view of the above problems associated with prior art technology, an object of the present invention is to provide a lens stopper mechanism without a conventional stop cap for stopping the lens. With the present invention, an imaging device can still provide effective resistance for stopping the lens and thus limit the movement of the lens to a certain range to function normally.

Meanwhile, the number of components within the imaging device, and the thickness and weight of the imaging device can all be reduced, so that a more compact imaging device is achieved.

According to the object of the present invention, there is provided a lens stopping mechanism comprising a case and a lens holder. The lens holder holds a lens and has at least one stopper portion; the stopper portion presses against the case after the lens holder moves toward the case for a predetermined distance. Preferably, the lens holder further comprises at least one protruding portion protruding outward relative to the edge of the lens holder, and the stopper portion is positioned at a side of the protruding portion that faces the case. Preferably, the protruding portions extend radially toward four corners of the case.

The lens stopper mechanism further comprises a frame surrounding the lens holder, and the frame has at least one recessed portion engaging with part of the protruding portion. Preferably, the frame has at least one case stopper that restricts the imaging device, so that the lens and the lens holder can move along the optical axis within the case.

With the lens stopper mechanism of the present invention, the movement of the lens and the lens holder can still be effectively restricted while a conventional stop cap is removed. Consequently, by applying a lens stopper mechanism of the invention to an imaging device, the number of components within the device can be reduced; also, the overall thickness and weight of the imaging device can be reduced, thereby achieving a more compact and lightweight imaging device.

DETAILED DESCRIPTION OF THE PREFERRED EMBODIMENTS

Figure 1:
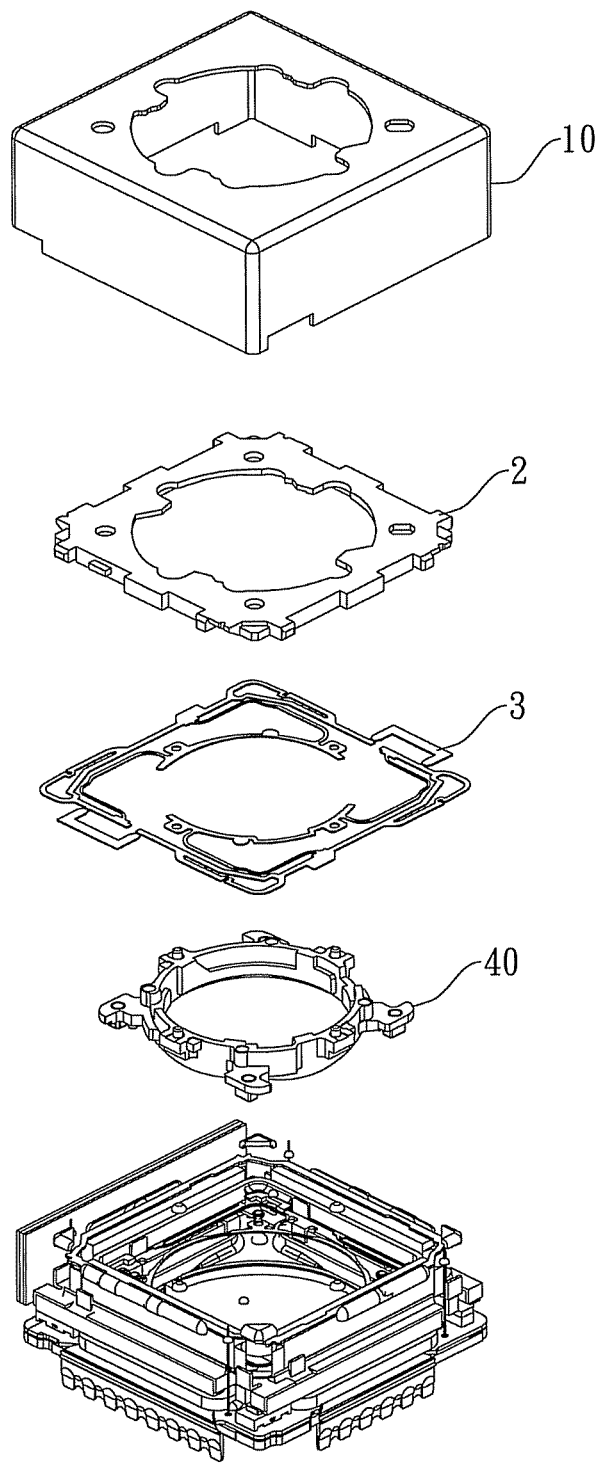
FIG. 1 is an exploded diagram of a prior art lens stopper mechanism.

The present invention now will be described more fully hereinafter with reference to the accompanying drawings, in which preferred embodiments of the invention are shown. Numerals mentioned in the following description refer to those shown in the drawings. It should be noted that the words "comprising" or "including" used in the description shall be interpreted as open-ended terms with the meaning of "including but not limited to." Moreover, those of ordinary skill in the art should understand that, there may be different designations for the same component/product; for example, a "lens holder" and a "lens retainer" may refer to the same component/product. Therefore, components/products that are of the same technical field and similar to those mentioned in the following description should also be included in the scope of the present application.

Figure 2:
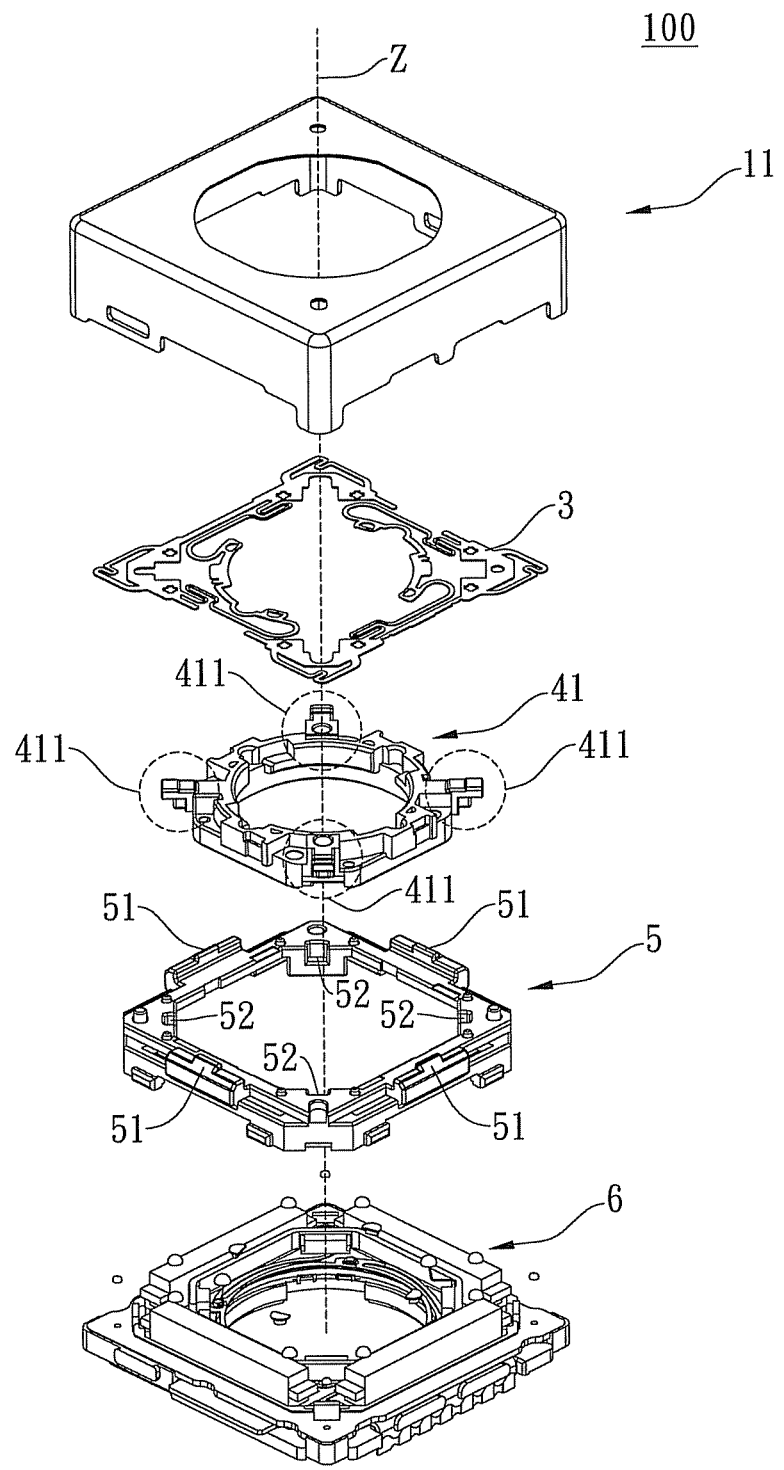
FIG. 2 is an exploded diagram of a lens stopper mechanism according to the present invention.

FIG. 2 is an exploded view of a lens stopper mechanism according to the present invention. As FIG. 2 shows, an imaging device 100 comprises a case 11, an upper spring 3, a lens holder 41, a frame 5, and a lens driving device 6. The case 11 is positioned at the outermost side (relative to the image forming elements) of the imaging device 100 to protect the imaging device 100 and stop its movement. The upper spring 3 is disposed above the lens holder 41 and the frame 5 to provide elastic support. The lens holder 41 is configured to hold a lens (not shown) and is able to move along the optical axis Z, so that the focal length of the imaging device 100 can be adjusted. The frame 5 is disposed around the lens holder 41. The frame 5 surrounds the lens holder 41 and supports the case 11, so that the lens holder 41 is able to move along the optical axis Z within the case 11. The lens driving device 6 comprises components such as zoom coils, magnets, a lower plate spring, anti-shake coils, a flexible circuit board, a base, and Hall elements. The lens driving device 6 is configured to control a voice coil motor to further achieve zoom control and optical anti-shake functions; also, the lens driving device 6 holds the case 11, the upper plate spring 3, the lens holder 41, and the frame 5.

Figure 3:
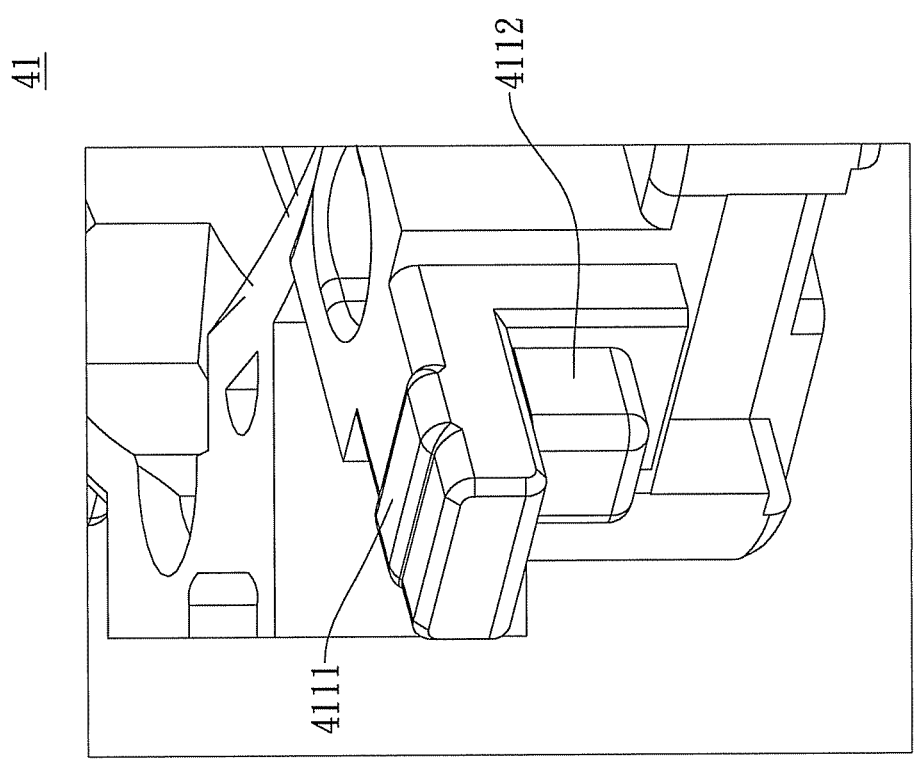
FIG. 3 is an enlarged view of a protruding portion of the lens holder according to the present invention.

The following description will give further details while focusing on the essential part of the invention—the case 11, the lens holder 41, the frame 5, and how these components form a lens stopper mechanism of the invention. The frame 5 has case stopper 51 supporting the case 11, so that the lens and the lens holder 41 are able to move along the optical axis Z within the case 11. The lens holder 41 has protruding portions 411 protruding outward relative to the edges of the lens holder 41. Please also refer to FIG. 3, which is an enlarged view of the protruding portion 411 of the lens holder 41 according to the present invention. As FIG. 3 shows, the protruding portion 411 has a stopper portion 4111 and an anti-rotation portion 4112. The stopper portion 4111 is positioned at a side of the protruding portion 411 that faces the case 11, and the anti-rotation portion 4112 is positioned at the opposite side—the side that does not face the case 11—of the protruding portion 411. After the lens driving device 6 drives the lens and the lens holder 41 to move toward the case 11 for a predetermined distance, the stopper portions 4111 will press against the case 11, thereby forcing the lens holder 41 and the lens to stop moving. In other words, the case 11 provides resistance for stopping the lens and the lens holder 41 from moving further outward along the optical axis Z. As such, the case 11 and the stopper portions 4111 of the protruding portions 411 form a lens stopper mechanism that may replace a conventional stop cap in an imaging device. The lens stopper mechanism of the invention can effectively restrain the lens and the lens holder 41 from moving further outward.

Moreover, in the illustrated embodiment, the protruding portions 411 extend radially toward the four corners of the case 11, and thus, the stopper portions 4111 contact the case 11 around the four corners of the case 11. This arrangement allows the stopper portions 4111 to press against the case 11 more firmly.

Each anti-rotation portion 4112 is positioned at the opposite side—the side that does not face the case 11—of each protruding portion 411 and engages with the recessed portion 52 of the frame 5. That is to say, part of each protruding portion 411 (i.e., the anti-rotation portion 4112) engages with the recessed portion 52 of the frame 5. As a result, the lens holder 41 is not able to rotate around the optical axis Z within the frame 5. It is thus ensured that the lens will not rotate in the imaging device.

It should be noted that, as shown in the illustrated embodiment, the lens holder 41 therein has its stopper portions 4111 positioned at the protruding portions 411. However, those of ordinary skill in the art should understand that without departing from the spirit and scope of this invention, the stopper portions may be arranged at any positions on the lens holder 41 that faces the case 11, instead of being positioned at the protruding portions 411. The stopper portions may be arranged at other positions and achieve the same effect that the stopper portions press against the case 11 after the lens holder moves outward along the optical axis Z. In this case, the stopper portions 4111 may not contact the case 11 around the four corners of the case 11. Furthermore, since the stopper portions may be arranged at any positions at a side of the lens holder 41 that faces the case 11, it is possible that the lens holder 41 has stopper portions only but does not have protruding portions 411.

Figure 4:
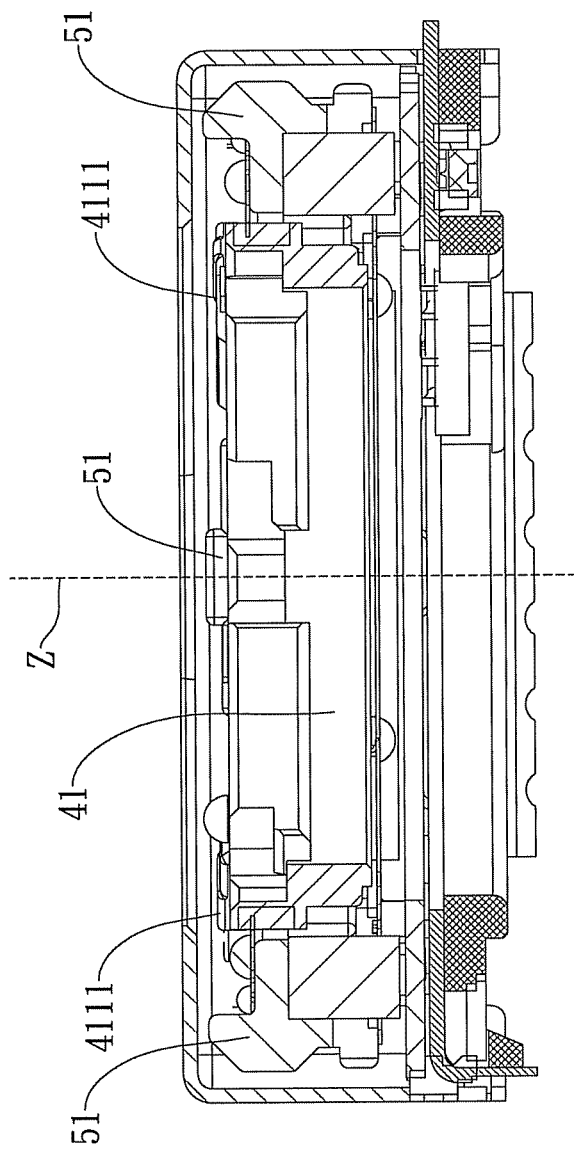
FIG. 4 is a cross-sectional view of a lens stopper mechanism according to the present invention.

FIG. 4 is a cross-sectional view of a lens stopper mechanism according to the present invention. As FIG. 4 shows, the lens holder 41 holds the lens (not shown) and is positioned at the center of the imaging device 100. The frame is disposed around the lens holder 41 to surround it. The case stoppers 51 support the case 11. FIG. 4 shows the state that the lens and the lens holder 41 are in the retracted position (i.e., the state that the lens and the lens holder 41 have not yet started to move toward the case 11). After the lens driving device drives the lens and the lens holder 41 to move toward the case 11 along the optical axis Z, the stopper portions 4111 of the lens holder 41 will press against the case 11 first because the stopper portions 4111 are in a higher position. The case 11 will then provide resistance for stopping the lens and the lens holder 41 from moving further outward, so that the movement of the lens and the lens holder 41 is restricted to within a certain range.

To sum up, since the lens holder according to the present invention has stopper portions that can press against the case directly, the case, accordingly, can provide resistance for stopping the lens and the lens holder from moving further outward along the optical axis. The case and the stopper portions of the lens holder form the lens stopper mechanism of the invention; the lens stopper mechanism can effectively restrict the movement of the lens and the lens holder to within a certain range. By applying the lens stopper mechanism of the invention to an imaging device, the conventional stop cap can be removed from the device; the number of components within the imaging device can thus be reduced. The overall thickness and weight of the imaging device can also be reduced, thereby achieving a more compact and lightweight imaging device. In addition, part of the protruding portion (i.e., the anti-rotation portion) of the invention engages with the recessed portion of the frame. Given this feature, the lens and the lens holder will not rotate within the frame, and consequently, damage to the motor can be avoided and stable image quality is ensured.

The embodiments depicted above and the appended drawings are exemplary and are not intended to limit the scope of the present invention. All modifications or alterations that have equivalent functions and are made without departing from the spirit and scope of the present invention fall within the scope of the appended claims.

What is claimed is:

1. A lens stopper mechanism, comprising:
   a case;
   a lens holder holding a lens; and
   a frame surrounding the lens holder;
   wherein the lens holder further comprises at least one protruding portion protruding outward relative to an edge of the lens holder, at least one stopper portion positioned at one side of the protruding portion that faces the case and pressing against the case after the lens holder moves toward the case for a predetermined distance, and at least one anti-rotation portion positioned at the opposite side of the protruding portion facing the case and in an inner radial position than the protruding portion;
   wherein the frame has at least one recessed portion engaging with the anti-rotation portion.

2. The lens stopper mechanism according to claim 1, wherein the frame has at least one case stopper supporting the case, so that the lens and the lens holder can move along an optical axis direction within the case.

3. The lens stopper mechanism to claim 1, wherein the protruding portions extend radially toward four corners of the case.

* * * * *